United States Patent
Cheung et al.

(10) Patent No.: US 12,072,266 B2
(45) Date of Patent: Aug. 27, 2024

(54) LEAK DETECTION SYSTEM FOR THERMAL INTERFACE FLUID

(71) Applicant: Microsoft Technology Licensing, LLC, Redmond, WA (US)

(72) Inventors: Rick Chun Kit Cheung, Lynnwood, WA (US); Luke Thomas Gregory, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 17/849,442

(22) Filed: Jun. 24, 2022

(65) Prior Publication Data

US 2023/0417619 A1 Dec. 28, 2023

(51) Int. Cl.
*G01M 3/16* (2006.01)
(52) U.S. Cl.
CPC ................... *G01M 3/16* (2013.01)
(58) Field of Classification Search
CPC .............................. G01M 3/16–188
See application file for complete search history.

(56) References Cited

U.S. PATENT DOCUMENTS

| | | | |
|---|---|---|---|
| 2016/0120039 A1* | 4/2016 | Bang | H05K 1/0203 156/60 |
| 2016/0178475 A1 | 6/2016 | Krishnan et al. | |
| 2020/0135611 A1* | 4/2020 | Czaplewski-Campbell | H01L 23/42 |
| 2020/0203254 A1 | 6/2020 | Dhane et al. | |
| 2020/0258809 A1* | 8/2020 | Nagafuchi | H01L 23/367 |

FOREIGN PATENT DOCUMENTS

WO 2022094316 A1 5/2022

OTHER PUBLICATIONS

"International Search Report and Written Opinion Issued in PCT Application No. PCT/US23/022461", Mailed Date: Aug. 29, 2023, 11 Pages.

* cited by examiner

*Primary Examiner* — Alexander A Mercado
(74) *Attorney, Agent, or Firm* — RAY QUINNEY & NEBEKER P.C.; Paul N. Taylor

(57) ABSTRACT

A leak detection system for a thermal interface material (TIM) includes a sensor located proximate to a processor. As thermal fluctuations or other events cause the TIM to flow out of the gap between the processor and a thermal management device, a leak detection sensor may detect the presence of the TIM. This allows an operator of the computing device to identify TIM leaks, thereby preventing or reducing damage to the processor or other electronic components of a computing device.

20 Claims, 10 Drawing Sheets

LEAK DETECTION SYSTEM FOR THERMAL INTERFACE FLUID

CROSS-REFERENCE TO RELATED APPLICATIONS

N/A.

BACKGROUND

Processors are often thermally connected to a thermal management device. In some situations, a thermal interface material (TIM) is injected between the processor and the thermal management device. The thermal conductivity of the TIM may allow heat generated by the processor to transfer to the thermal management device. The heat may be dissipated into the atmosphere or transferred to a heat sink by the thermal management device. This may maintain the processor at an operating temperature.

BRIEF SUMMARY

In some aspects, the techniques described herein relate to a leak detection system for a processor. The leak detection system includes a base, a processor connected to the base, and a thermal management device. A thermal interface material (TIM) is located between the processor and the thermal management device and thermally connects the processor to the thermal management device. A leak detection sensor is located proximate to the processor to detect a leak of the TIM from between the processor and the thermal management device.

In some aspects, the techniques described herein relate to a printed circuit board (PCB). The PCB includes a socket for a processor and a leak detection sensor located proximate the socket, the leak detection sensor being configured to detect a leak of a thermal interface material (TIM) thermally connecting the processor to a thermal management device.

In some aspects, the techniques described herein relate to a method for leak detection. The method includes installing a processor on a base, the base including a leak detection sensor proximate to the processor. A thermal interface material (TIM) is inserted into a gap between a thermal management device and the processor, the TIM thermally connecting the processor to the thermal management device. A leak detection system detects a leak of the TIM from between the processor and the thermal management device using the leak detection sensor.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a cross-sectional view of the computing system of FIG. 1-1;

FIG. 2 is a representation of a computing system having a leak detection sensor, according to at least one embodiment of the present disclosure;

FIG. 6-1 and FIG. 6-2 are representations of a computing system having a leak detection sensor and a TIM leak, according to at least one embodiment of the present disclosure;

DETAILED DESCRIPTION

This disclosure generally relates to devices, systems, and methods for detecting a leak of a thermal interface material (TIM) from between a processor and a thermal management device (such as a heat sink, vapor chamber, cold plate, and the like). The TIM may be injected between the processor and the thermal management device and transfer heat from the processor to the thermal management device. In some situations, thermal cycling of the processor and thermal management device may increase and decrease the temperature of the TIM. In some situations, the thermal cycling of the TIM may cause the TIM to increase and decrease in volume. In some situations, increasing and decreasing the volume of the TIM may result in at least a portion of the TIM leaking from the gap between the processor and the thermal management device. The leaking TIM may damage portions of the processor or server on which the processor is mounted.

In accordance with at least one embodiment of the present disclosure, the printed circuit board (PBC) that supports the processor may include a leak detection sensor. The leak detection sensor may detect when some of the TIM has leaked from the gap between the processor and the thermal management device. For example, when thermal cycling or another event causes the TIM to leak from the gap, the TIM may flow onto the base. The leak detection sensor may detect the presence of the TIM on the PCB. In some embodiments, the leak detection sensor may transmit an alert to an operator or manager of the server. This may allow the operator to mitigate the leak before the TIM damages the processor or other portions of the PCB or before the damage caused by the TIM is increased.

Figure 1:
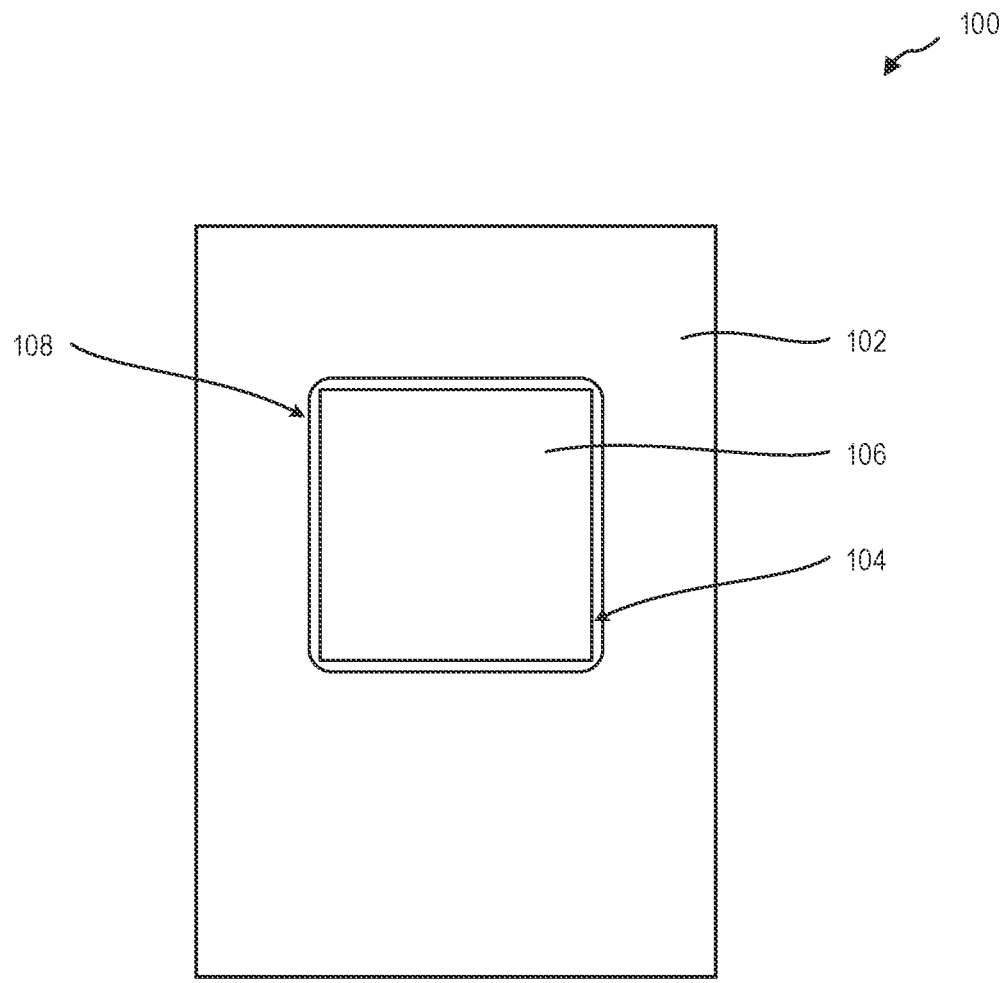
FIG. 1-1 is a top-down view of a computing system, according to at least one embodiment of the present disclosure.

FIG. 1-1 is a representation of a computing system 100 having a base 102 and a processor 104, according to at least one embodiment of the present disclosure. The base 102 may be a printed circuit board (PCB) and may include one or more sockets or other connection elements for the processor 104 to be installed or connected to the PCB. The PCB may include other electronic elements, such as other processors, electrical connectors, electrical wiring, any other electronic elements, and combinations thereof.

During computing operations, the processor 104 may generate heat. In some situations, the processor 104 may generate more heat than may be radiated away from the processor 104. If the processor 104 overheats, then the processor 104 may experience reduced functionality and/or may be damaged. To cool the processor 104 to an operating temperature, the processor 104 may be connected to a thermal management device 106. The thermal management device 106 may include any type of thermal management device that may absorb heat generated by the processor 104, thereby cooling the processor 104 to the operating temperature. For example, the thermal management device 106 may include a cold plate for a fluid-cooled thermal management device 106 (e.g., a plate having channels into which a cooling fluid may flow to absorb heat), a vapor chamber (e.g., a closed chamber having a phase-change fluid therein that uses evaporation and condensation to transfer heat from the processor 104), radiating fins (e.g., heat-conductive elements with a surface area to radiate heat from the processor 104), any other thermal management device 106, and combinations thereof.

Figures 1, 2:
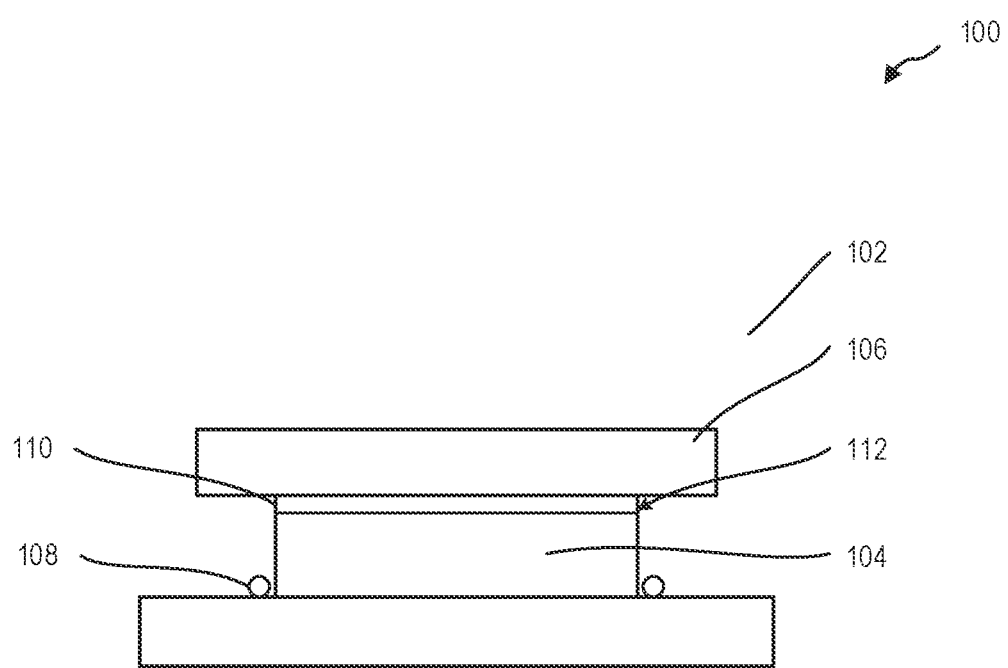
Figure 2:
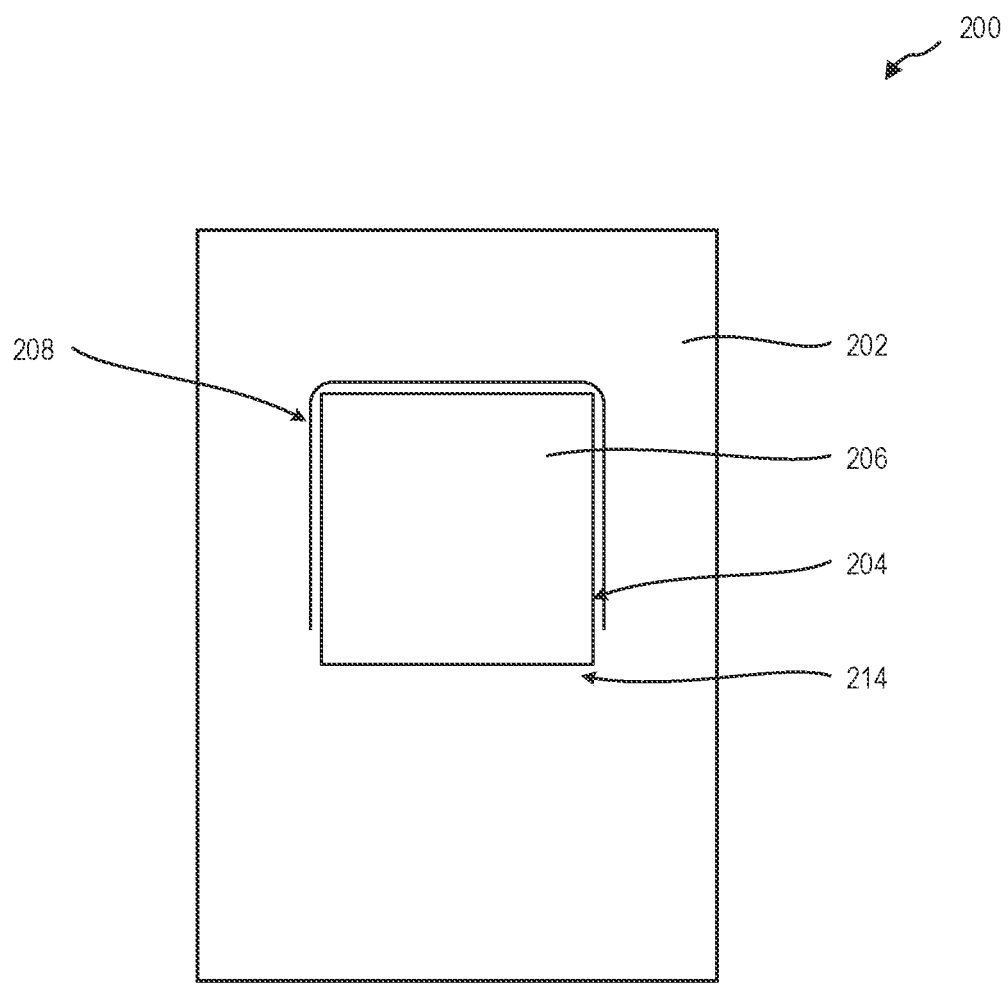

As may be seen in FIG. 1-2, which is a cross-sectional view of the computing system 100 of FIG. 1-1, a thermal interface material (TIM) 110, may be placed between the processor 104 and the thermal management device 106. The TIM 110 may be placed in a gap 112 between the processor 104 and the thermal management device 106. Put another way, the TIM 110 may be in contact with the processor 104 and the thermal management device 106. The TIM 110 may be thermally conductive. Thus, heat generated by the processor 104 may be transferred to the TIM 110 based on the contact of the TIM 110 with the processor 104. The thermal management device 106 may absorb the transferred heat based on the contact of the TIM 110 with the thermal management device 106.

The TIM 110 may be formed from a flowable material. For example, the TIM 110 may include a plurality of thermally conductive particles (e.g., metal, or other thermally conductive material formed into spherical or spheroidal shapes). The thermally conductive particles may be suspended in a flowable suspension media, such as naphtha, oil, silicon, or other flowable material. The flowable TIM 110 may be flowed into the gap 112 between the processor 104 and the thermal management device 106. In some situations, a volume of the TIM 110 may be flowable upon contact with an outside force but may retain its shape absent the outside force (e.g., when only acted on by the force of gravity). In this manner, once the TIM 110 is flowed into the gap 112 between the processor 104 and the thermal management device 106, the TIM 110 may stay in the gap 112 (e.g., the TIM 110 may stay in contact with the processor 104 and the thermal management device 106).

The computing system 100, and the processor 104 and thermal management device 106, may experience thermal fluctuations. For example, the ambient temperature of the computing system 100 may vary based on various conditions, including seasonal variations in temperature, transportation between different locations, storage, and so forth. Furthermore, the processor 104 may not be utilized at the same utilization rate. For example, the processor 104 may experience increases and decreases in computing operations, thereby increasing and decreasing the heat generated by the processor 104.

As discussed herein, these thermal fluctuations may result in at least a portion of the TIM 110 flowing out of the gap 112 between the processor 104 and the thermal management device 106. For example, the thermal fluctuations may cause an increase and decrease in the volume of the TIM 110, based on the coefficients of thermal expansion of the conductive particles and the suspension media. The changes in volume may result in at least a portion of the TIM 110 migrating out of the gap 112 between the processor 104 and the thermal management device 106.

The TIM 110 may be at least partially electrically conductive. For example, the thermally conductive particles may be formed from an electrically conductive metal. In some examples, the suspension media may be at least partially electrically conductive. In some situations, when the TIM 110 migrates or flows out of the gap 112 between the processor 104 and the thermal management device 106, the TIM 110 may cause shorts in other elements of the computing system 100. This may reduce the functionality of the computing system 100, and in some situations, may cause the computing system 100 to stop functioning.

In some embodiments, when TIM 110 flows out of the gap 112 between the processor 104 and the thermal management device 106, the TIM 110 may leave a void in the gap 112 between the processor 104 and the thermal management device 106. Because the TIM 110 transfers heat between the processor 104 and the thermal management device 106, a void in the gap 112, where the TIM 110 was located may reduce or prevent the heat transfer between the processor 104 and the thermal management device 106. Reduced heat transfer may cause the processor 104 to overheat, thereby resulting in increased throttling of the processor 104 and/or damage to the processor 104.

In accordance with at least one embodiment of the present disclosure, the PCB of the base 102 may include a leak detection sensor 108. The leak detection sensor 108 may be located around the processor 104 and the thermal management device 106. The leak detection sensor 108 may be configured to detect the presence of leaked TIM 110. In this manner, if the TIM 110 leaks from the gap 112 between the processor 104 and the thermal management device 106, the leak detection sensor 108 may detect the presence of the TIM 110. The leak detection sensor 108 may be connected to a leak detection system. When the leak detection sensor 108 detects the presence of the leaked TIM 110, the leak detection system may perform one or more mitigation activities, such as providing an alert to an operator or shutting down the computing system 100.

The leak detection system may allow the operator or manager of the computing system 100 to mitigate the leak of the TIM 110. For example, based on an alert by the leak detection system, the operator may clean the leaked TIM 110 and/or insert more TIM 110 into the gap 112 between the processor 104 and the thermal management device 106. In some situations, thermal fluctuations of the TIM 110 may cause the TIM 110 to migrate over a period of time, such as days, weeks, months, or years. Because the computing system 100 and/or the processor 104 may not often be visually inspected, a flowing of the TIM 110 over time may gradually degrade performance of the computing system 100 and/or the processor 104. The reduced performance of the computing system 100 and/or the processor 104 may have more than one cause, including software and hardware causes. An early warning of the leaked TIM 110 may allow the operator to readily identify the cause of the reduced performance as the leaked TIM 110. This may allow the operator to mitigate the leaked TIM 110, thereby preventing or reducing reduced functionality and/or damage to the computing system 100 and/or the processor 104.

The leak detection sensor 108 may be located proximate or adjacent to the processor 104 and/or the thermal management device 106. The leak detection sensor 108 may be located close enough to the gap 112 and the TIM 110 that, when the TIM 110 leaks out of the gap 112, the TIM 110 may contact the leak detection sensor 108. For example, as may be seen in FIG. 1-2, the leak detection sensor 108 may be located at the base of the processor 104. The processor 104 shown has a smaller surface area than the thermal management device 106 (e.g., the thermal management device 106 overhangs the processor 104). The leak detection sensor 108 may be located at the base 102 of the processor 104 (e.g., where the processor 104 engages the PCB base 102, the socket of the PCB) so that, if any TIM 110 leaks, the TIM 110 may contact the leak detection sensor 108 as soon as the TIM 110 contacts the base 102. This may help the leak detection system to detect leaks early, thereby preventing or reducing damage to the computing system 100 and/or processor 104.

In some embodiments, the leak detection sensor 108 may be offset from the contact of the processor 104 with the base 102. For example, the leak detection sensor 108 may be located at the edge of the thermal management device 106. In some examples, the leak detection sensor 108 may be offset from the edge of the thermal management device 106. The leak detection sensor 108 may be located proximate to or adjacent to the processor 104, the TIM 110, the gap 112, or the thermal management device 106 in any manner to detect leaks to limit or prevent damage to electronic components to the computing system 100. In some embodiments, the leak detection sensor 108 may be offset from other electronic components to detect when the leaked TIM 110 is getting close to them.

In some embodiments, the leak detection sensor 108 may be embedded in the PCB base 102. For example, when the PCB is printed, the leak detection sensor 108 may be printed into the PCB. In some embodiments, the leak detection sensor 108 may be separately formed and later connected to the PCB base 102. The leak detection sensor 108 may be any type of sensor. For example, the leak detection sensor 108 may include a conductive wire. When the TIM 110 contacts the wire of the leak detection sensor 108, the resistance of the wire, or the resistance of a current passed through the wire of the leak detection sensor 108 may change. The changed resistance may indicate the presence of the TIM 110.

In the embodiment shown in FIG. 1-1, the leak detection sensor 108 surrounds an entirety (e.g., a full circumference) of the processor 104 and thermal management device 106. In some embodiments, the leak detection sensor 108 may surround an entirety of the socket of the PCB base 102 into which the processor 104 is connected. In some embodiments, the leak detection sensor 108 may surround an entirety of the gap 112. In some embodiments, the leak detection sensor 108 may surround any portion of the gap 112 that is open and out of which the TIM 110 may leak. The TIM 110 may leak out of the gap 112 at any open location. By surrounding an entirety of the gap 112, the leak detection sensor 108 may detect any TIM 110 that leaks from the gap 112.

In the embodiment shown in FIG. 1-1, the leak detection sensor 108 may have a similar shape and proportions as an external outline as the processor 104 and/or the thermal management device 106. For example, the processor 104 may be rectangular, and the leak detection sensor 108 may be rectangular with the same or similar dimensions to surround an entirety of the processor 104. In some embodiments, the leak detection sensor 108 may have a different shape or proportions as the processor 104 and/or the thermal management device 106. For example, the leak detection sensor 108 may have a profile or outline including one or more cut-outs, protrusions, curves, bends, or other changes in shape. This may allow the leak detection sensor 108 to accommodate structures on the PCB base 102. In some embodiments, the leak detection sensor 108 may have a profile or outline that is similar to or follows other structures or electronic components on the PCB base 102. For example, the leak detection sensor 108 may have a profile or outline that includes one or more cut-outs, protrusions, curves, bends, or other changes in chape to providing sensing coverage or to avoid other electronic elements of the PCB base 102.

FIG. 2 is a representation of a computing system 200 having a PCB base 202 and a processor 204 connected to the PCB base 202 at a socket, according to at least one embodiment of the present disclosure. A thermal management device 206 is thermally connected to the processor 204. A thermal interface material (TIM) may be located between the processor 204 and the thermal management device 206 and may transfer heat from the processor 204 to the thermal management device 206.

A leak detection sensor 208 may be located proximate to or adjacent to the processor 204 and/or the thermal management device 206. In the embodiment shown, the leak detection sensor 208 does not surround an entirety of the processor 204 and may include an open portion 214 (e.g., a break in the continuity of the leak detection sensor 208). For example, the leak detection sensor 208 shown is located on three of the four sides of the processor 204 and/or thermal management device 206 with the open portion 214 being located at a fourth side. In some embodiments, the leak detection sensor 208 may be located at openings in the gap between the processor 204 and the thermal management device 206. The TIM may be flowable out of the gap through the openings and may contact the leak detection sensor 208.

While the leak detection sensor 208 shown surrounds three sides of the processor 204 and the thermal management device 206, it should be understood that the leak detection sensor 208 may surround any number of sides of the processor 204 and the thermal management device 206. In some embodiments, the leak detection sensor 208 may be located across a portion of one of the sides of the processor 204 and the thermal management device 206. Put another way, the open portion 214 may be located along a portion of one of the sides of the processor 204 and the thermal management device 206.

In some embodiments, the open portion 214 of the leak detection sensor 208 (e.g., the portion of the leak detection sensor 208 that does not surround the processor 204 and the thermal management device 206) may be located on any side of the leak detection sensor 208. For example, the open portion 214 of the leak detection sensor 208 may include the insertion location for the TIM. During installation, at least a portion of the TIM may leak from the insertion location, such as through overfill and/or dripped TIM from the insertion device. With the leak detection sensor 208 located at the insertion location, any overfill or drip may trigger the leak detection sensor 208, which may lead to a false detection of a leak.

In some embodiments, overfill or drip may trip the leak detection sensor 208, which may alert the technician and/or operator of the spill or drip during installation. This may help to improve the quality of installation of the TIM.

Figure 3:
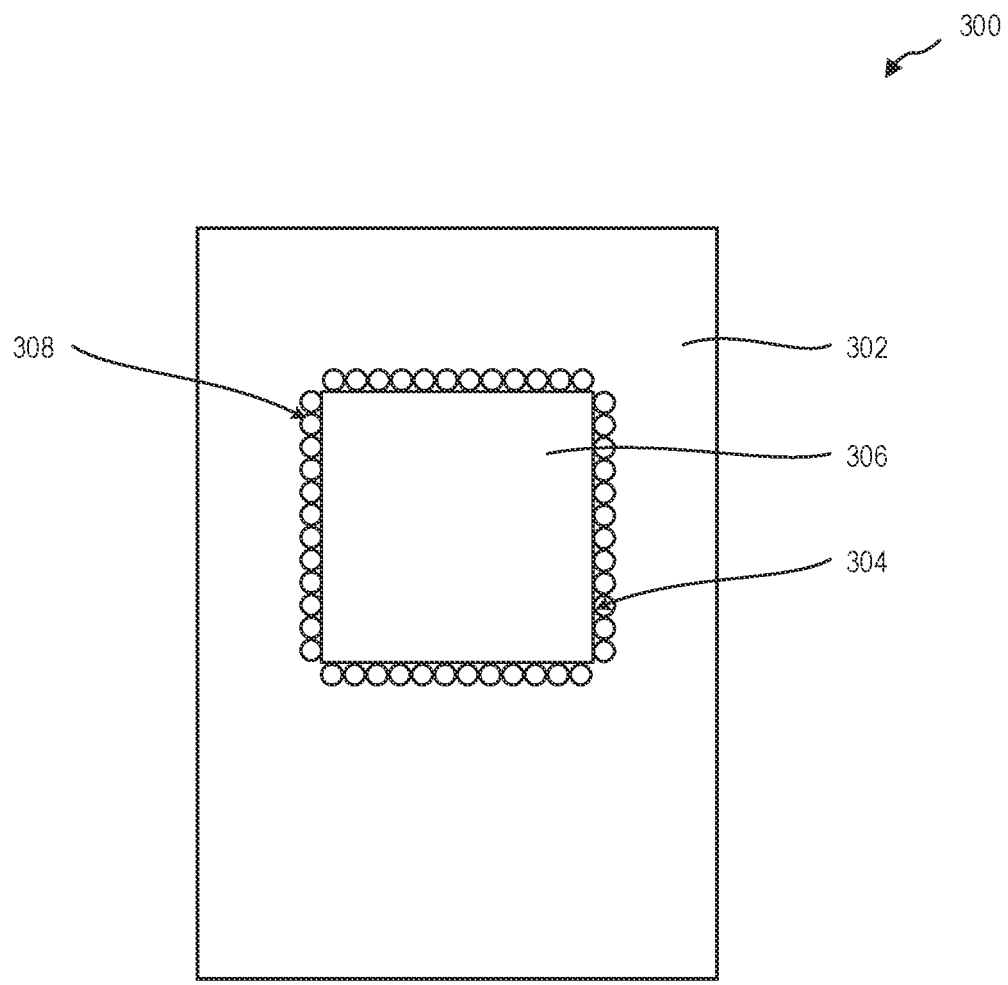
FIG. 3 is a representation of a computing system having a leak detection sensor, according to at least one embodiment of the present disclosure.

FIG. 3 is a representation of a computing system 300 having a PCB base 302 and a processor 304 connected to the PCB base 302 at a socket, according to at least one embodiment of the present disclosure. A thermal management device 306 is thermally connected to the processor 304. A thermal interface material (TIM) may be located between the processor 304 and the thermal management device 306 and may transfer heat from the processor 304 to the thermal management device 306.

The computing system 300 may include a leak detection sensor 308. The leak detection sensor 308 may include a plurality of individual sensors. Each sensor of the plurality of sensors may be configured to independently sense the presence of the leaked TIM. Each sensor of the plurality of sensors may be associated with a location. Based on which sensors detect the presence of the leak, the location and/or extent of the leak may be determined. For example, more sensors tripped may be associated with a larger leak.

In some embodiments, individual sensors may be turned off. For example, if the TIM leaks out during installation, such as through overfilling, dripping, or otherwise leaking, one or more of the plurality of leak detection sensor 308 may detect the leak. Upon detection of the installation leak, the installation technician or operator may shut off the detecting sensors. In some embodiments, the installation leak may be small, and the number of associated detecting sensors may be small. Shutting down the associated detecting sensors may result in a small gap of sensor coverage. Further leaks of the TIM, even at the same site as the installation leak, before they become problematic, may be larger than the installation leak, thereby reducing the impact of the gap in sensor coverage.

Figure 4:
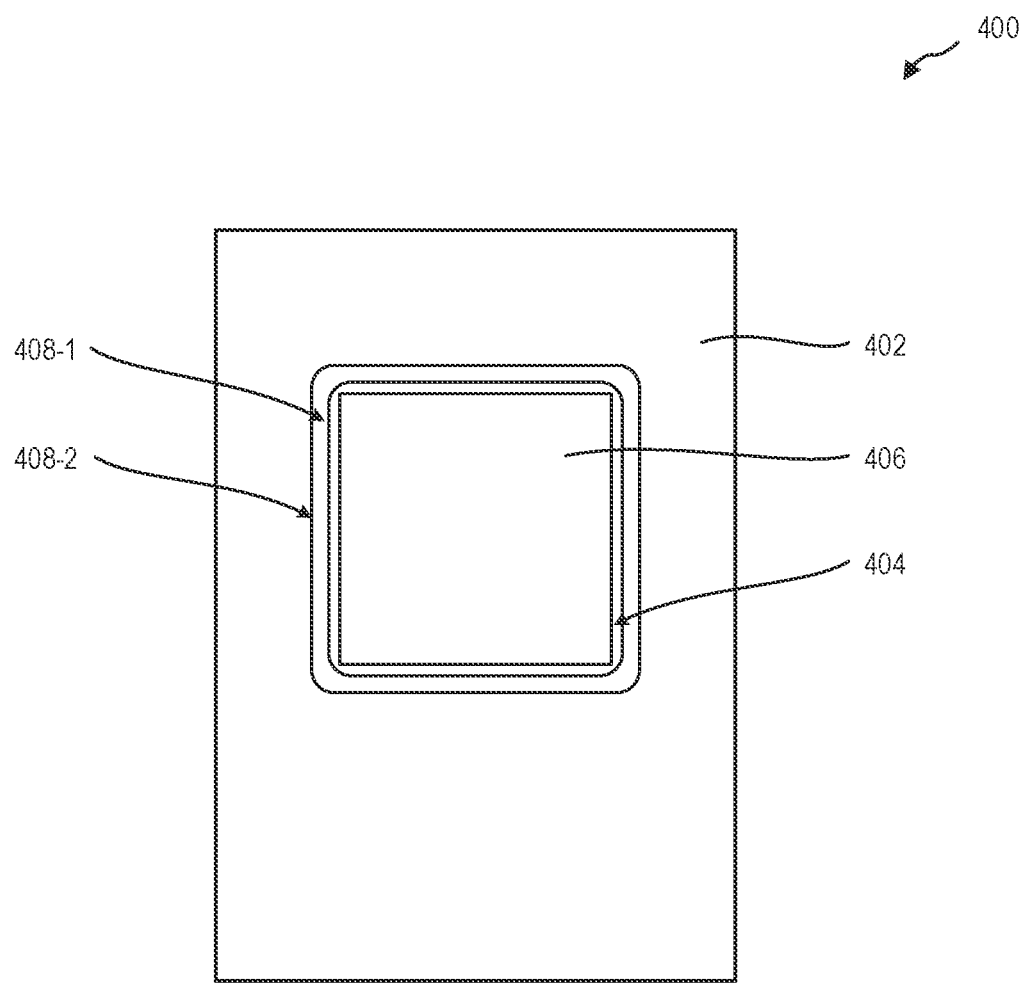
FIG. 4 is a representation of a computing system having a leak detection sensor, according to at least one embodiment of the present disclosure.

FIG. 4 is a representation of a computing system 400 having a PCB base 402 and a processor 404 connected to the PCB base 402 at a socket, according to at least one embodiment of the present disclosure. A thermal management device 406 is thermally connected to the processor 404. A thermal interface material (TIM) may be located between the processor 404 and the thermal management device 406 and may transfer heat from the processor 404 to the thermal management device 406.

The computing system 400 may include a leak detection sensor (collectively 408). In the embodiment shown, the leak detection sensor 408 includes a first leak detection sensor 408-1 and a second leak detection sensor 408-2. The first leak detection sensor 408-1 may be located proximate to or adjacent to the processor 404 and the thermal management device 406. The second leak detection sensor 408-2 may be located proximate to or adjacent to the first leak detection sensor 408-1. For example, the second leak detection sensor 408-2 may be offset from the first leak detection sensor 408-1. Put another way, the second leak detection sensor 408-2 may be located further away from the processor 404, and the TIM (and any associated leak of the TIM).

In some embodiments, placing the second leak detection sensor 408-2 further away from the first leak detection sensor 408-1 may allow for layered detection of the leak of the TIM. For example, if the TIM leaks, the first leak detection sensor 408-1 may first detect the leak. An extent of the TIM leak may be determined by which of the leak detection sensors 408 had detected the TIM leak. For example, if the first leak detection sensor 408-1 has detected the TIM leak, while the second leak detection sensor 408-2 has not detected the TIM leak, then the TIM leak has not extended to the second leak detection sensor 408-2. Because the second leak detection sensor 408-2 is further away from the processor 404 than the first leak detection sensor 408-1, the TIM leak may contact the first leak detection sensor 408-1 first, and the second leak detection sensor 408-2 second.

In some embodiments, the mitigation response of the leak detection system may be based on which of the leak detection sensors 408 has detected the TIM leak. For example, if only the first leak detection sensor 408-1 has detected the TIM leak, then the leak detection system may determine that the TIM leak is small and place a low-priority alert to mitigate the TIM leak. If the first leak detection sensor 408-1 and the second leak detection sensor 408-2 have both detected the TIM leak, then the leak detection system may determine that the TIM leak is larger and may place a higher priority alert to mitigate the TIM leak.

While the computing system 400 shown includes two leak detection sensors 408, it should be understood that the computing system 400 may include any number of leak detection sensors 408, including 1, 2, 3, 4, 5, 6, 7, 8, 9, 10, or more leak detection sensors 408. As discussed herein, the leak detection sensors 408 may be offset from one another to provide layered detection of a TIM leak. In some embodiments, the leak detection sensors 408 may include one or more sensors located at or near other electronic structures on the PCB base 402. For example, the computing system 400 may include a leak detection sensor 408 located next to a processor, a wire, any other electronic structure, and combinations thereof. This may help indicate if a TIM leak is spreading toward an electronic structure, thereby allowing the operator to determine the urgency of a TIM leak.

Figure 5:
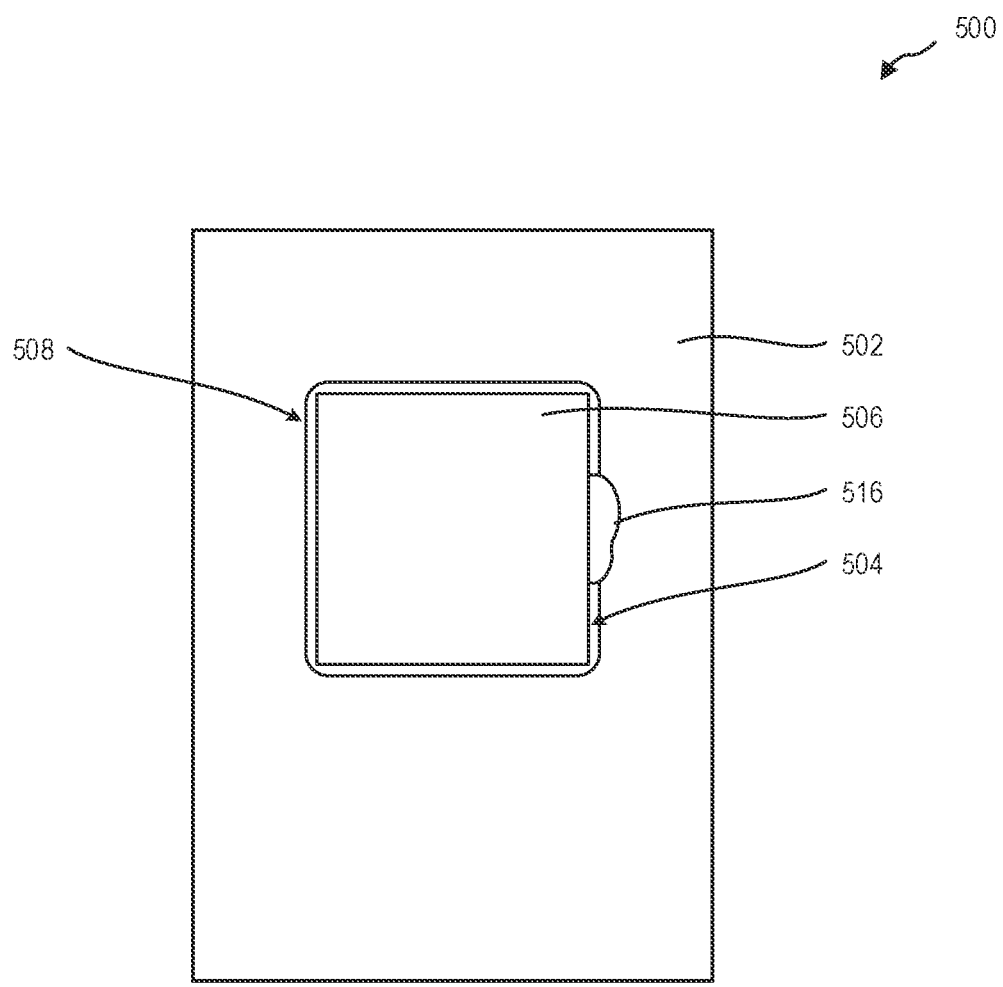
FIG. 5 is a representation of a computing system having a leak detection sensor and a TIM leak, according to at least one embodiment of the present disclosure.

FIG. 5 is a representation of a computing system 500 having a PCB base 502 and a processor 504 connected to the PCB base 502 at a socket, according to at least one embodiment of the present disclosure. A thermal management device 506 is thermally connected to the processor 504. A thermal interface material (TIM) may be located between the processor 504 and the thermal management device 506 and may transfer heat from the processor 504 to the thermal management device 506.

The computing system 500 may include a leak detection sensor 508. In the embodiment shown in FIG. 5, a TIM leak 516 has occurred from between the gap between the processor 504 and the thermal management device 506. As may be seen, the TIM leak 516 has migrated over the leak detection sensor 508. This may cause the leak detection sensor 508 to detect the TIM leak 516. This may allow an operator or other manager to detect the presence of the TIM leak 516 and implement one or more mitigation protocols.

Figures 1, 6:
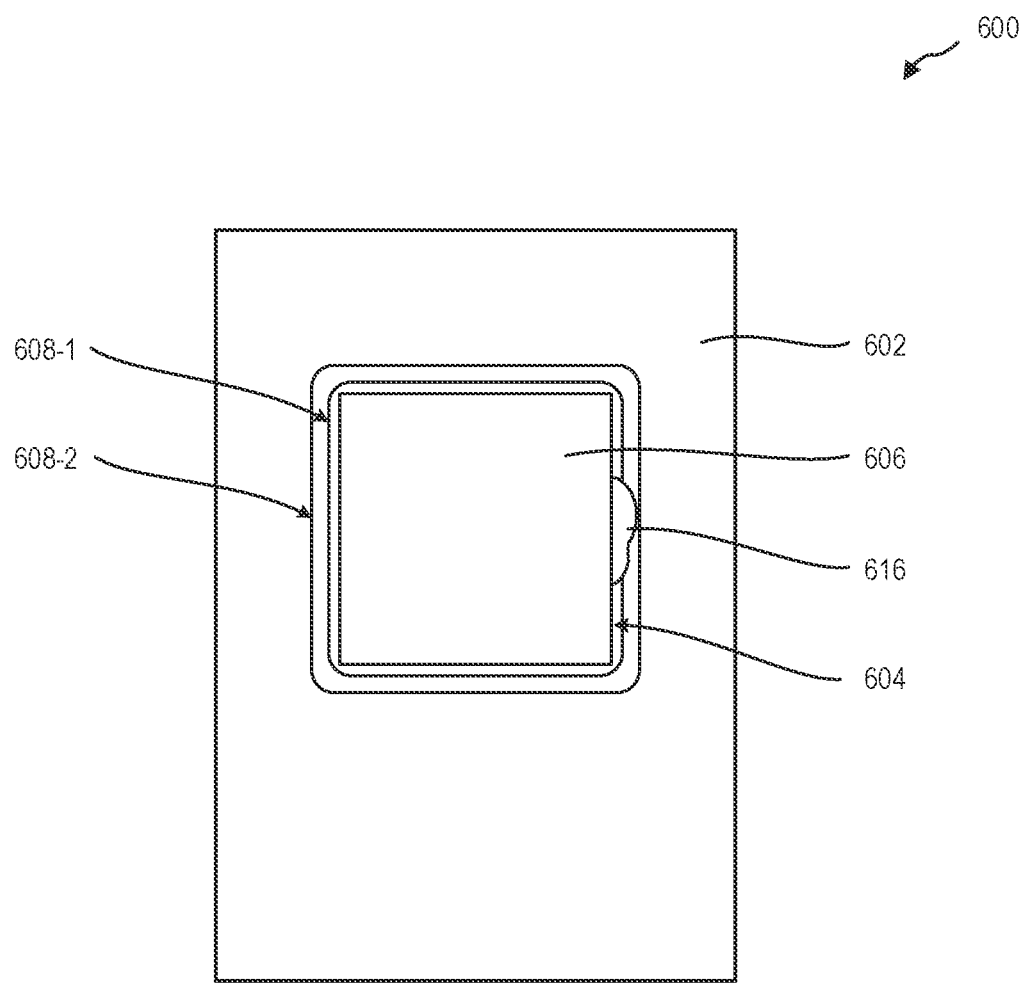
Figures 2, 6:
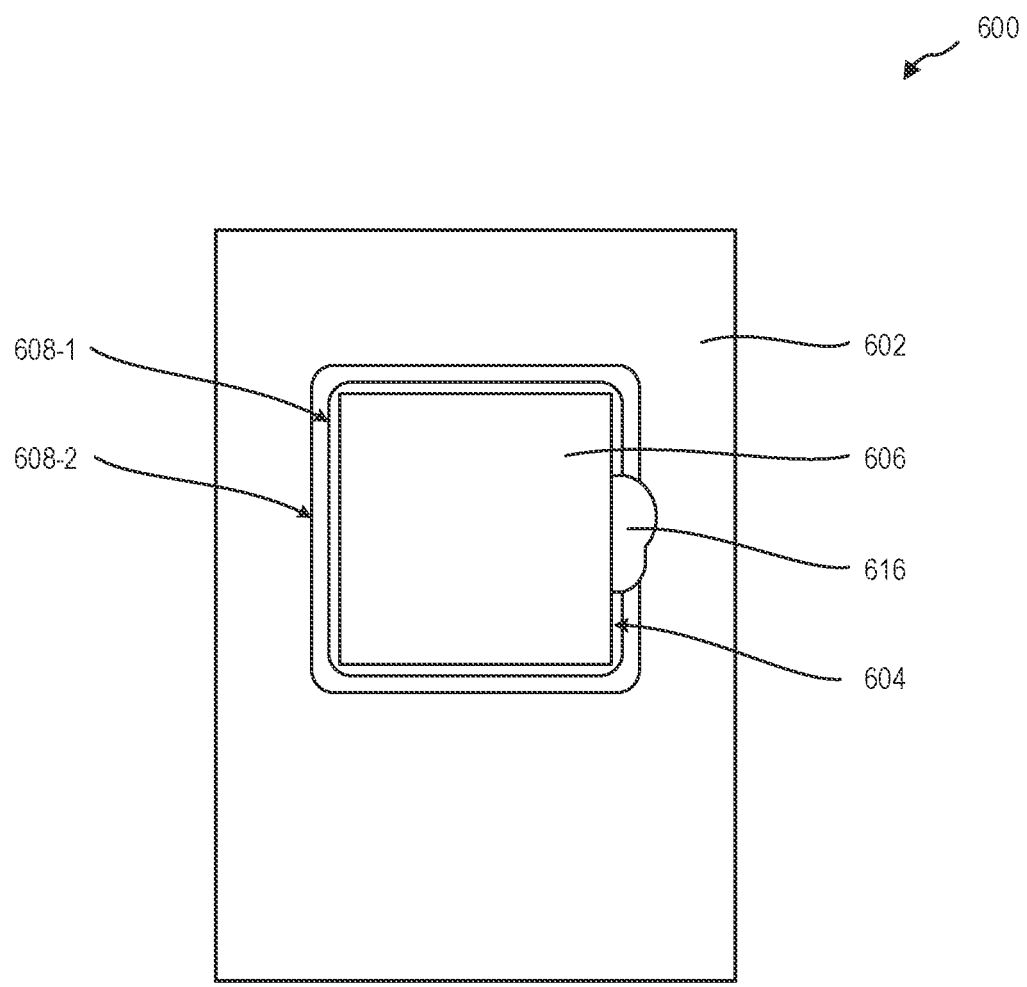

FIG. 6-1 is a representation of a computing system 600 having a PCB base 602 and a processor 604 connected to the PCB base 602 at a socket, according to at least one embodiment of the present disclosure. A thermal management device 606 is thermally connected to the processor 604. A thermal interface material (TIM) may be located between the processor 604 and the thermal management device 606 and may transfer heat from the processor 604 to the thermal management device 606.

The computing system 600 may include a leak detection sensor (collectively 608). In the embodiment shown, the leak detection sensor 608 includes a first leak detection sensor 608-1 and a second leak detection sensor 608-2. The first leak detection sensor 608-1 may be located proximate to or adjacent to the processor 604 and the thermal management device 606. The second leak detection sensor 608-2 may be located proximate to or adjacent to the first leak detection sensor 608-1. For example, the second leak detection sensor 608-2 may be offset from the first leak detection sensor 608-1. Put another way, the second leak detection sensor 608-2 may be located further away from the processor 604.

In the embodiment shown, a TIM leak 616 has occurred from between the processor 604 and the thermal management device 606. As may be seen, the TIM leak 616 has migrated over the first leak detection sensor 608-1 but has not migrated over the second leak detection sensor 608-2. This may allow the operator to at least partially determine the extent of the leak or determine that the leak has not leaked as far away from the processor 604 as the second leak detection sensor 608-2 is offset from the processor 604. In this manner, the operator may determine that the TIM leak 616 has not extended past the second leak detection sensor 608-2, and therefore is not a large leak. This may allow the leak detection system to set a priority level for the TIM leak 616 based on which of the leak detection sensors 608 have detected the TIM leak 616.

In FIG. 6-2, the TIM leak 616 has grown. The extent of the TIM leak 616 has grown until the TIM leak 616 has migrated over the second leak detection sensor 608-2. This may allow the operator to determine that the TIM leak 616 has extended past the distance away from the processor 604 that the second leak detection sensor 608-2 is, and that the TIM leak 616 is larger, or that the TIM leak 616 is growing. This may allow the leak detection system to set a priority level for the TIM leak 616 based on which of the leak detection sensors 608 have detected the TIM leak 616.

In some embodiments, the leak detection system may determine a rate of growth of the TIM leak 616. For example, the leak detection system may determine how long it takes for the TIM leak 616 to increase in size and/or migrate from the first leak detection sensor 608-1 to the second leak detection sensor 608-2. The leak detection system may set a priority level to the TIM leak 616 based on the rate of growth, with a higher priority being associated with a faster rate of growth.

Figure 7:
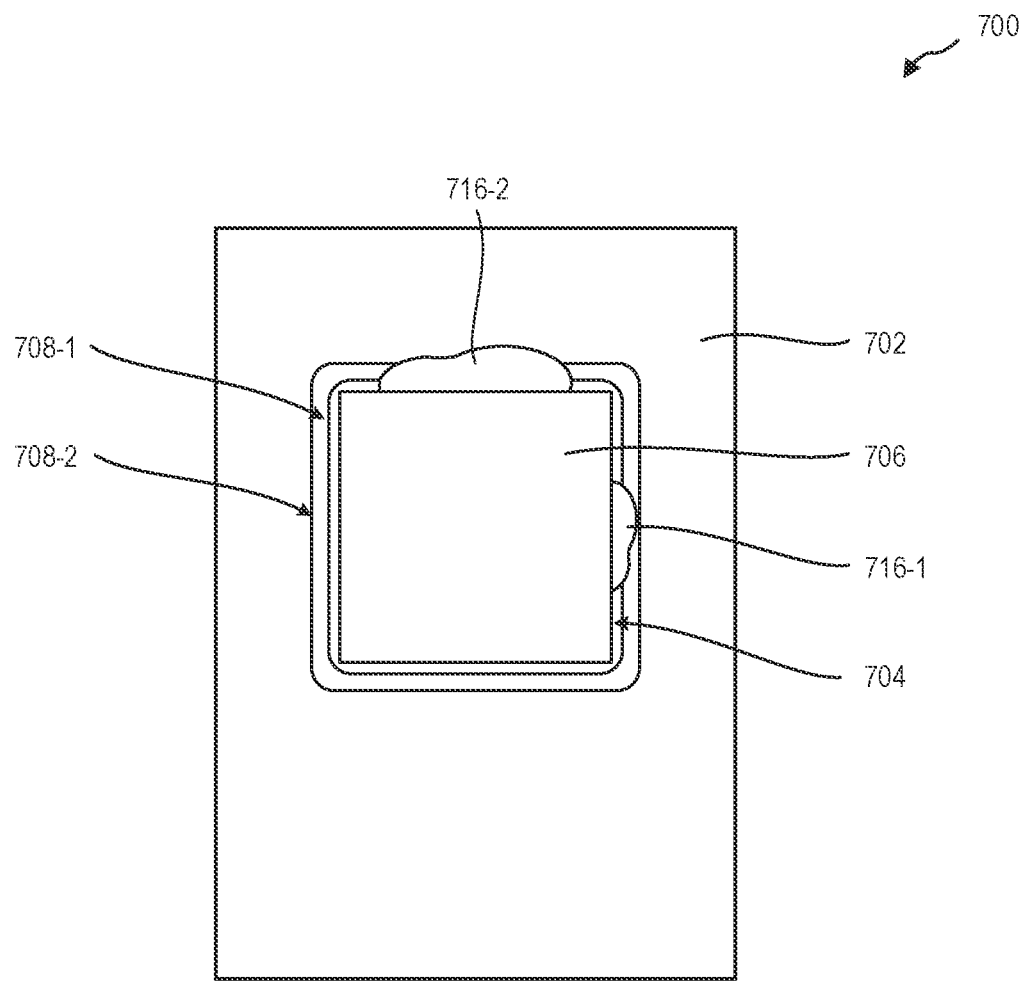
FIG. 7 is a representation of a computing system having a leak detection sensor and two TIM leaks, according to at least one embodiment of the present disclosure.

FIG. 7 is a representation of a computing system 700 having a PCB base 702 and a processor 704 connected to the PCB base 702 at a socket, according to at least one embodiment of the present disclosure. A thermal management device 706 is thermally connected to the processor 704. A thermal interface material (TIM) may be located between the processor 704 and the thermal management device 706 and may transfer heat from the processor 704 to the thermal management device 706.

The computing system 700 may include a leak detection sensor (collectively 708). In the embodiment shown, the leak detection sensor 708 includes a first leak detection sensor 708-1 and a second leak detection sensor 708-2. The first leak detection sensor 708-1 may be located proximate to or adjacent to the processor 704 and the thermal management device 706. The second leak detection sensor 708-2 may be located proximate to or adjacent to the first leak detection sensor 708-1. For example, the second leak detection sensor 708-2 may be offset from the first leak detection sensor 708-1. Put another way, the second leak detection sensor 708-2 may be located further away from the processor 704.

In the embodiment shown, two TIM leaks (collectively 716) have occurred from the gap between the processor 704 and the thermal management device 706. A first TIM leak 716-1 has migrated over the first leak detection sensor 708-1 and a second TIM leak 716-2 has migrated over the first leak detection sensor 708-1 and the second leak detection sensor 708-2.

In accordance with at least one embodiment of the present disclosure, the leak detection sensor 708 may detect a location of the TIM leaks 716. For example, in the view shown, the leak detection sensor 708 may detect that the first TIM leak 716-1 is located to the right of the processor 704 and that the second TIM leak 716-2 is located to the top of the processor 704. This may allow an operator to determine where the TIM leaks 716 are occurring. In this manner, the operator may determine whether a particular electronic structure on the PCB base 702 is close to one of the TIM leaks 716. This may allow the leak detection system to set a priority to the TIM leaks 716 based on the location of the TIM leak.

In some embodiments, the leak detection sensor 708 may detect an extent of a particular TIM leak 716. For example, the leak detection sensor 708 may determine that the first TIM leak 716-1 has migrated over the first leak detection sensor 708-1 and that the second TIM leak 716-2 has migrated over the second leak detection sensor 708-2. This may allow the leak detection system to determine that the second TIM leak 716-2 is larger than the first TIM leak 716-1. In some embodiments, the TIM leaks 716 may increase in size at different rates. The leak detection sensor 708 may detect the growth of individual TIM leaks 716, thereby allowing the operator to determine which of the TIM leaks 716 may threaten particular electronic structures on the PCB base 702. This may allow the leak detection system to assign a priority to the TIM leaks 716 based on their size and/or location.

Figure 8:
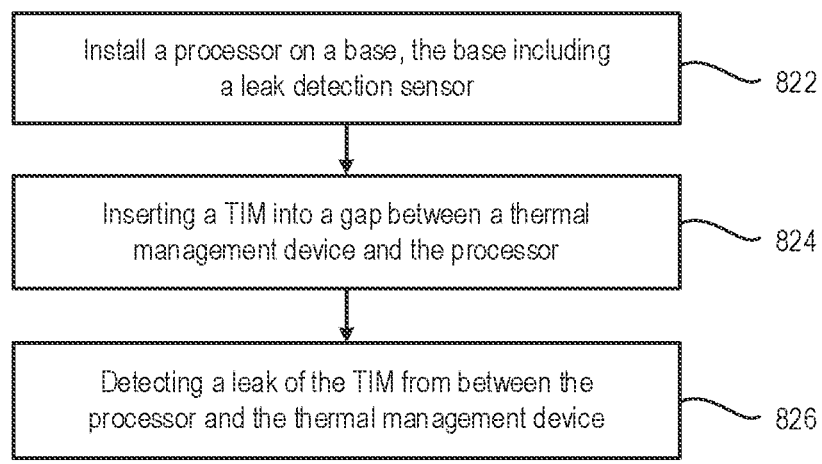
FIG. 8 is a flowchart of a method for leak mitigation, according to at least one embodiment of the present disclosure.

FIG. 8, the corresponding text, and the examples provide a number of different methods, systems, devices, and non-transitory computer-readable media of the leak detection system. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts for detecting a TIM leak in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

The method may include installing a processor on a PCB base, the base including a leak detection sensor proximate to or adjacent to the processor at 822. A TIM may be inserted into a gap between the thermal management device and the processor at 824. The TIM may thermally connect the processor to the thermal management device. In some embodiments, the thermal management system may detect a leak of the TIM from between the processor and the thermal management device using the leak detection sensor at 826.

In some embodiments, inserting the TIM into the gap may include flowing the TIM into the gap. In some embodiments, detecting the leak of the TIM includes detecting a change in resistance of a current passed through the leak detection sensor. In some embodiments, detecting the leak of the TIM includes detecting a location of the leak. In some embodiments, detecting the leak of the TIM includes detecting an extent of the leak. In some embodiments, detecting the extent of the leak includes detecting the leak at a second detection sensor located further away from the processor than the first leak detection sensor. In some embodiments, based on detecting the leak, the leak mitigation system may provide an alert of the leak. In some embodiments, providing the alert may include determining a priority of the leak. As discussed herein, the priority of the leak may be determined based on the location of the leak, the extent of the leak, the rate of growth of the leak, any other factor, and combinations thereof.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A leak detection system for a processor, comprising:
   a base;
   a processor connected to the base;
   a thermal management device;
   a thermal interface material (TIM) located between the processor and the thermal management device and thermally connecting the processor to the thermal management device; and
   a leak detection sensor located proximate to the processor to detect a presence of a leaked TIM from between the processor and the thermal management device, wherein the presence of the leaked TIM is detected by a contact of the leaked TIM and the leak detection sensor.

2. The leak detection system of claim 1, wherein the leak detection sensor is located around a socket of the base, the processor being connected to the base at the socket.

3. The leak detection system of claim 1, wherein the leak detection sensor surrounds the processor.

4. The leak detection system of claim 1, wherein the TIM is flowable.

5. The leak detection system of claim 1, wherein the TIM is electrically conductive.

6. The leak detection system of claim 5, wherein the leak detection sensor includes a wire, and wherein a contact of the TIM with the wire changes a resistance of the wire.

7. The leak detection system of claim 1, wherein the leak detection sensor is embedded in the base.

8. The leak detection system of claim 1, wherein the leak detection sensor is a first leak detection sensor, and further comprising a second leak detection sensor proximate to the processor.

9. The leak detection system of claim 8, wherein the second leak detection sensor is located further away from the processor than the first leak detection sensor.

10. A printed circuit board (PCB), comprising:
  a socket for a processor; and
  a leak detection sensor located proximate the socket, the leak detection sensor being configured to detect a presence of a leaked thermal interface material (TIM), wherein the presence of the leaked TIM is detected by a contact of the leaked TIM and the leak detection sensor, wherein the TIM is thermally connecting the processor to a thermal management device.

11. The PCB of claim 10, wherein the leak detection sensor surrounds the socket.

12. The PCB of claim 10, wherein the leak detection sensor is a first leak detection sensor, and further comprising a second leak detection sensor located further away from the socket than the first leak detection sensor.

13. A method for leak detection, comprising:
  installing a processor on a base, the base including a leak detection sensor proximate to the processor, wherein the leak detection sensor is configured to detect a presence of a leaked thermal interface material (TIM), wherein the presence of the leaked TIM is detected by a contact of the leaked TIM and the leak detection sensor;
  inserting a TIM into a gap between a thermal management device and the processor, the TIM thermally connecting the processor to the thermal management device; and
  detecting the presence of the leaked TIM from between the processor and the thermal management device using the leak detection sensor.

14. The method of claim 13, wherein inserting the TIM into the gap between the thermal management device and the processor includes flowing the TIM into the gap.

15. The method of claim 13, wherein detecting the presence of the leaked TIM includes detecting a change in resistance of a current passed through the leak detection sensor.

16. The method of claim 13, wherein detecting the presence of the leaked TIM includes detecting a location of the leaked TIM.

17. The method of claim 13, wherein detecting the presence of the leaked TIM includes detecting an extent of the leaked TIM.

18. The method of claim 17, wherein the leak detection sensor is a first leak detection sensor, and wherein detecting the extent of the leaked TIM includes detecting the presence of the leaked TIM at a second leak detection sensor located further away from the processor than the first leak detection sensor.

19. The method of claim 13, further comprising, based on detecting the presence of the leaked TIM, providing an alert of the leaked TIM.

20. The method of claim 19, wherein providing the alert includes determining a priority of the leaked TIM.

* * * * *